United States Patent
Kato et al.

(10) Patent No.: US 7,234,873 B2
(45) Date of Patent: Jun. 26, 2007

(54) ROLLING-CONTACT BEARING CONTAINING SOLID LUBRICANT THEREIN

(75) Inventors: Masataka Kato, Gifu-ken (JP); Toshiaki Nishimatsu, Gifu-ken (JP)

(73) Assignee: Nippon Thompson Co., Ltd., Tokyo (JP)

(*) Notice: Subject to any disclaimer, the term of this patent is extended or adjusted under 35 U.S.C. 154(b) by 54 days.

(21) Appl. No.: 10/786,287

(22) Filed: Feb. 26, 2004

(65) Prior Publication Data

US 2004/0165800 A1    Aug. 26, 2004

(30) Foreign Application Priority Data

Feb. 26, 2003    (JP)    ............... 2003-049712

(51) Int. Cl.
*F16C 33/66* (2006.01)
*F16C 33/56* (2006.01)

(52) U.S. Cl. ............... 384/572; 384/463; 384/560; 384/576

(58) Field of Classification Search ............ 384/58, 384/126, 127, 463, 470, 523, 527, 560, 572, 384/576, 907
See application file for complete search history.

(56) References Cited

U.S. PATENT DOCUMENTS

| | | | | |
|---|---|---|---|---|
| 3,135,564 | A | * | 6/1964 | Agens ............... 384/470 |
| 3,239,291 | A | * | 3/1966 | Batt ............... 384/560 |
| 3,596,533 | A | * | 8/1971 | Nightingale ............... 74/559 |
| 4,223,963 | A | * | 9/1980 | Glodin et al. ............... 384/527 |
| 4,492,415 | A | | 1/1985 | Baile et al. |
| 5,615,956 | A | * | 4/1997 | Oba et al. ............... 384/470 |
| 6,267,510 | B1 | * | 7/2001 | Herber et al. ............... 384/449 |
| 6,296,393 | B1 | * | 10/2001 | Yabe et al. ............... 384/463 |
| 6,485,184 | B1 | * | 11/2002 | Adachi et al. ............... 384/463 |

FOREIGN PATENT DOCUMENTS

| | | |
|---|---|---|
| DE | 101 10 915 A1 | 9/2002 |
| JP | 2-47417 | 3/1990 |
| JP | 9-94893 | 4/1997 |
| JP | 1999-151938 | 6/1997 |
| JP | 2000-104746 | 9/1998 |
| JP | 11-153144 | 6/1999 |
| JP | 2000-145791 | 5/2000 |
| JP | 2001-208084 | 8/2001 |
| JP | 2001-330029 | 11/2001 |
| JP | 2002-147470 | 5/2002 |
| JP | 2003-113844 | 4/2003 |

* cited by examiner

*Primary Examiner*—Thomas R. Hannon
(74) *Attorney, Agent, or Firm*—Browdy and Neimark, PLLC (57) ABSTRACT

A cage, rollers and solid lubricant are all formed integrally into a complete unitary molding with using difference in thermal expansion in a mold. Assembling the complete unitary molding into the race in the rolling-contact bearing is made easier. The complete unitary molding is made such that the rollers remain exposed partially at their rolling surfaces above the inside circular surface of the complete unitary molding while the solid lubricant on the outside circular surface of the complete unitary molding is squeezed out from between the rolling surfaces of the rollers and the inside circular surface of the outside mold upon molding operation, thereby getting the rolling surfaces of the rollers exposed partially. The mold is composed of an outside mold, an inside mold and an intermediate mold, which is made of a substance larger in thermal expansion than other substance for the outside and inside molds.

12 Claims, 5 Drawing Sheets

ROLLING-CONTACT BEARING CONTAINING SOLID LUBRICANT THEREIN

FIELD OF THE INVENTION

The present invention relates to a standardized rolling-contact bearing of stud type for a tracking roller and, more particularly, to a rolling-contact bearing containing solid lubricant therein, in which more than one roller held in a cage is combined with solid lubricant into a complete unitary molding that is interposed between an outer and inner raceways.

BACKGROUND OF THE INVENTION

Conventionally, there is well known a rolling-element assembly used for rolling-contact bearings. An example of the rolling-element assemblies is disclosed in, for example Japanese Patent Laid-Open No. 2001-208084 in which more than one roller is held for rotation in a pocket in a cage and embedded in solid lubricant with a bearing circular surface thereof being exposed partially out of the solid lubricant. With the prior rolling-element assemblies of the sort recited earlier, however, the rollers are not combined with the cage into a unit and, therefore apt to come apart from the cage.

Moreover, Japanese Patent Laid-Open No. 2000-145791 discloses a needle bearing or cam follower of maintenance-free type that is filled with sufficient amount of lubricant. The cam follower of maintenance-free type cited earlier leaves out a cage used commonly to hold more than one needle therein. Instead, there is interposed a separator made of polymer containing any lubricant therein. The separator is made with more than rectangular opening while a stud has no oil hole to supply lubricant through there. With the prior cam follower constructed as stated earlier, the separator, although made of polymer allowing the lubricant oozing over the rollers, needs the troublesome working of fitting many rollers into the rectangular openings, one to each opening, to complete the cam follower.

A bearing for cam follower is disclosed in, for example Japanese Utility Model Laid-Open No. 47417/1990, in which thrust washers are fit in an outer ring thick in axial cross-section where more than one roller is installed. With the cam follower with thrust washers recited just above, two pieces of thrust washer are installed for rotation on axially opposite ends of the outer ring in such a way that one is interposed between a circular surface of a flange on a stud end and an axially setback end in the outer ring while another is arranged between a circular surface of a retainer plate and another axially setback end of the outer ring, which is opposite axially to the first axial setback in the outer ring. The thrust washers are made of iron or steel member that is recessed partially on any one side thereof and coated with a skin. The prior cam follower, although assembled with thrust washers, has contained no solid lubricant therein.

Moreover, a mold for producing a tapered-roller bearing with lubricant-containing polymer is disclosed in, for example Japanese Patent Laid-Open No. 2001-330029, in which more than one tapered roller is confined between upper and lower mold halves and lubricant-containing polymer is poured into a mold cavity through an injection gate with the aid of interposing resilient member, thereby producing the tapered-roller bearing for low torque use, which is filled with lubricant-containing polymer. The prior production procedure recited above for the roller bearing has to go through several chores including getting the upper and lower mold halves mated precisely together with each other and also lubricant-containing polymer poured through the narrow or small injection gate into the mold.

Another process for producing a rolling bearing filled with lubricant-containing polymer is disclosed in, for example Japanese Patent Laid-Open No. 153144/1999, in which the lubricant-containing polymer is partially cut away at wedges flanking the line contact of the roller with the outer ring. This prior production process as stated just earlier also has to go through several chores including cutting away the lubricant-containing polymer at every wedge flanking the line contact of every roller with the outer ring, and also pouring the lubricant-containing polymer with the help of spacers.

A further another process for a rolling-contact bearing filled with solid lubricant is known as disclosed in, for example Japanese Patent Laid-Open No. 94893/1997, in which powdered thermoplastic resin mixed with lubricating grease is first poured into a clearance between an outer and inner ring of a rolling-contact bearing at ambient temperature, and then the rolling-contact bearing is fit in and clamped between upper and lower mold halves that has been previously heated. After the lubricant has hardened along surface area, which is in contact with the mold, into a lamellar structure, the rolling-contact bearing is transferred from the mold into a heating furnace where the rolling-contact bearing is heated, followed by cooled down to get the lubricant solidified entirely. The prior production method recited earlier, however, needs many manufacturing steps and several more chores including clamping overall the rolling-contact bearing between the mold halves.

Meanwhile, the stud-type roller bearing with tracking roller is generally used in a way fastened to any moving body with a stud made at a plain end thereof with male threads, which either extends through the moving body, followed by fitting into a female threaded hole in a nut or fits directly into a female threaded hole in the moving body. The tracking roller or the outer ring of the stud-type roller bearing comes into rolling contact with any counterpart to convert any motion of the counterpart to get the moving body making linear motion or curvilinear motion. The stud-type roller bearing with tracking roller constructed as stated earlier, although having been extensively employed for the cam-follower mechanisms or rolling-contact bearings for linear motion in printing machines, food processing machinery, liquid crystal display/semiconductor device manufacturing equipment, tool machines, industrial robots, office-automation machines, and so on, are needed recently to get further maintenance-free in construction, higher in hermetically sealed property and resistance against lopsided load and ready for long-life services, even with high performance.

With the stud-type roller bearing with tracking roller or the follower of rolling-contact bearing, one favorable scenario to deal with the demands as stated earlier is that the cage and more than one roller are all assembled together with solid lubricant into a complete unitary molding where three components: cage, more than one roller and solid lubricant are all integrated in such a way the lubricant fills a clearance between rolling element raceways to lubricate the rollers rolling between the raceways. Nevertheless, there still remains a major challenge to consider about how to make the complete unitary molding that is easy to handle the molding itself and simple to install the molding between any inside rotating member and an outer ring.

SUMMARY OF THE INVENTION

The present invention, therefore, has as its primary object to overcome the problems as described just above and more particular to provide a rolling-contact bearing containing solid lubricant therein, in which a complete unitary molding comprised of a cage and more than one roller joined together with solid lubricant into a unitary part is incorporated between rolling element raceways of an inside and outside relatively rotating members, contrary to any conventional construction where the solid lubricant is sealed directly along the raceways coming into rolling contact with the rollers. Especially, the present invention provides a rolling-contact bearing containing solid lubricant therein, in which the complete unitary molding comprised of a cage and more than one roller joined together with solid lubricant is easily and surely made in such a way the rollers are partially exposed above an inside circular surface of the complete unitary molding, with only the help of difference in thermal expansion among an inside mold, outside mold and intermediate mold, and also ready for assembling with ease into the rolling element raceways.

The present invention is concerned with a rolling-contact bearing containing solid lubricant therein; comprising an inside rotating member having a guideway area made thereon with a first raceway, an outside rotating member rotary relatively to the inside rotating member and having a second raceway opposing to the first raceway, and a cage with rollers spaced at a preselected interval around the cage to roll through a race defined between the first raceway on the inside rotating member and the second raceway on the outside rotating member; wherein the cage with the rollers is formed together with solid lubricant to lubricate the rollers running through the race into a complete unitary molding with using a mold, the rollers being kept exposed partially at their circular rolling-surfaces out of an inside circular surface of the complete unitary molding; and wherein the complete unitary molding is assembled into the race of the bearing.

In an aspect of the present invention, a rolling-contact bearing containing solid lubricant therein is disclosed in which the inside rotating member is a stud having a flange integral with any one of axially opposite ends of the guideway area and a rod integrally extending from another of the axially opposite ends of the guideway area and made less in diameter than the guideway area, and a circular plate fits over the rod of the stud.

In another aspect of the present invention, a rolling-contact bearing containing solid lubricant therein is disclosed in which the outside rotating member is an outer ring recessed at axially opposite ends thereof to form setbacks, one to each end, thereby providing an intermediate area midway between the setbacks, on which is made the second raceway, and wherein the flange on the stud fits in any one of the setbacks while the circular plate fits in another setback.

In another aspect of the present invention, a rolling-contact bearing containing solid lubricant therein is disclosed in which thrust rings made of wear-resistant plastics such as polyetheretherketone and so on fit in the setbacks recessed in the outer ring on to the flange and the circular plate, respectively, and wherein the thrust rings are placed along an outer circumference of axially opposite ends of the complete unitary molding.

In another aspect of the present invention, a rolling-contact bearing containing solid lubricant therein is disclosed in which seal members of synthetic resin or synthetic rubber are placed in a way coming into abutment against outer circumferences of the flange and the circular plate, one to each outer circumference.

In another aspect of the present invention, a rolling-contact bearing containing solid lubricant therein is disclosed in which the stud is made therein an oil port open at a plain end thereof and communicating with an oil passage, which extends to an radially outside circular surface around the guideway member, and also communicating with another oil passage, which extends to an outside circular surface around the rod.

In another aspect of the present invention, a rolling-contact bearing containing solid lubricant therein is disclosed in which the outer ring incorporated in any counterpart has an outside surface of spherical configuration.

In a further another aspect of the present invention, a rolling-contact bearing containing solid lubricant therein is disclosed in which the outside rotating member is an outer ring having flanges at axially opposite ends thereof and a circular area lying midway between the flanges, the cage with the rollers being embraced inside the circular area of the outer ring the cage; wherein the outer ring, the cage with the rollers are all formed together with solid lubricant by use of the mold into a complete unitary molding; and wherein the complete unitary molding including the outer ring therein fits over the inside rotating member. In another aspect of the present invention, a rolling-contact bearing containing solid lubricant therein is disclosed in which the outer ring has an oil groove made circumferentially of a circular outside surface thereof, and an oil hole extended from the circular outside surface to a circular inside surface of the outer ring.

In another aspect of the present the invention, a rolling-contact bearing containing solid lubricant therein is disclosed in which the mold is comprised of an outside mold having an inside circular surface, an inside mold disposed inside the outside mold and made up of a radially thicker area and a radially reduced area less than the thicker area, and an intermediate mold disposed to fit closely over an outside circular surface around the reduced area of the inside mold, defining a circular clearance over the inside circular surface of the outside mold, the intermediate mold being made of a substance that is larger in thermal expansion than other substance for the outside and inside molds, and wherein the cage with the rollers spaced at a preselected interval around the cage is placed together with the solid lubricant and formed into a complete unitary molding with the help of a difference in thermal expansion between the intermediate mold and the outside mold.

In another aspect of the present invention, a rolling-contact bearing containing solid lubricant therein is disclosed in which the cage with the rollers spaced at regular intervals is first placed into the clearance between the intermediate mold and the outside mold, and the solid lubricant is poured into the clearance and around the cage and the rollers to fill the clearance as long as to reach everywhere including gaps left between the cage and every roller, then the mold is heated to get the intermediate mold to expand by heat greater than the outside mold, whereby the solid lubricant is pressed against the rollers around the cage with pressure developed by the difference in thermal expansion between the intermediate mold and the outside mold, followed by solidifying at ambient temperature into the complete unitary molding. As an alternative, the solid lubricant in solution state is poured into the clearance and around the cage and the rollers to fill the clearance as long as to reach everywhere including gaps left between the cage and every roller, followed by solidifying at ambient temperature.

In a further another aspect of the present invention, a rolling-contact bearing containing solid lubricant therein is disclosed in which the outside rotating member of the outer ring having flanges at axially opposing ends thereof is placed in the clearance between the intermediate mold and the outside mold, and the cage with the rollers spaced at regular intervals is surrounded with the inside circular surface of the inside the outer ring.

With the rolling-contact bearing containing solid lubricant therein constructed as stated earlier, the complete unitary molding, as made by solidification in the mold, which is given with the help of any difference in expansion by heat between an outside and intermediate molds, can be precisely formed precisely and most easily with rollers being exposed partially at their rolling surfaces above the inside and outside circular surfaces, especially inside circular surface of the complete unitary molding, but most enshrouded in the solid lubricant. The complete unitary molding provided according to the present invention makes it possible to continue supplying solid lubricant to the rollers, thereby making the rolling-contact bearing virtually maintenance-free. Moreover, no solid lubricant remains between the raceway around the outer ring or the inside rotating member such as the stud, inner ring or the like and the rolling surfaces of the rollers. Thus, the complete unitary molding does not have to cut any excess of solid lubricant away from both the inside and outside circular surfaces of the molding after the molding procedure thereof, which can make sure of smooth rolling motion of the rollers. The rolling-contact bearing having assembled the complete unitary molding therein can be made compact or slim in construction and maintenance-free virtually. Moreover, the stud or outer ring is allowed to have oil port therein, which serves to supply any lubricant consumed. The outer ring having an outside surface made in a part of sphere can conform well to any lopsided load. In the rolling-contact bearing containing solid lubricant therein according to the present invention, the complete unitary molding in which the cage, rollers and solid lubricant are all joined together into a single part contributes to rendering the rolling-contact bearing itself higher in hermetic property and ready for long-life services.

For the provision of the rolling-contact bearing containing solid lubricant therein constructed according to the present invention, just assembling the complete unitary molding in which the cage, rollers and solid lubricant have been all joined together into a single part into between the outside rotating member such as the outer ring or the like and the inside rotating member such as the inner ring or the like is needed to finish the rolling-contact bearing of the sort as stated earlier. The complete unitary molding, because of formed with only the help of any difference in expansion by heat among parts of the mold, will be made certainly with rollers being exposed partially at their rolling surfaces above the inside circular surface of the complete unitary molding, thereby free of any post-treatment to cut away partially the solid lubricant. Thus, the complete unitary molding can be expected to make it with ease and less cost. Assembling the complete unitary molding into the rolling-contact bearing, moreover, makes it possible to render the rolling-contact bearing maintenance-free. The stud or outer ring is allowed to have oil passage through which the lubricant is supplied as it is consumed. The rollers exposed out of the inside circular surface of the complete unitary molding ensure smooth rolling of the rollers. Insofar as the outside circular surface of the complete unitary molding is concerned, moreover, the solid lubricant is squeezed out of between the outside mold and the rollers during the molding procedure to get the rollers exposed at their rolling surfaces, resulting in making sure that the rollers come into smooth rolling-contact with the outer ring.

DETAILED DESCRIPTION OF THE EMBODIMENTS

Figure 4:
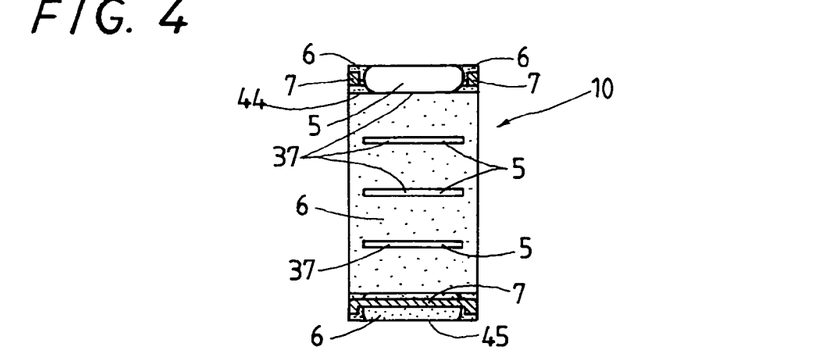
FIG. 4 is an axial sectional view, taken on the plane of the line II—II of FIG. 5, of a complete unitary molding to be assembled into the stud-type roller bearing with tracking roller of FIG. 2.
Figure 5:
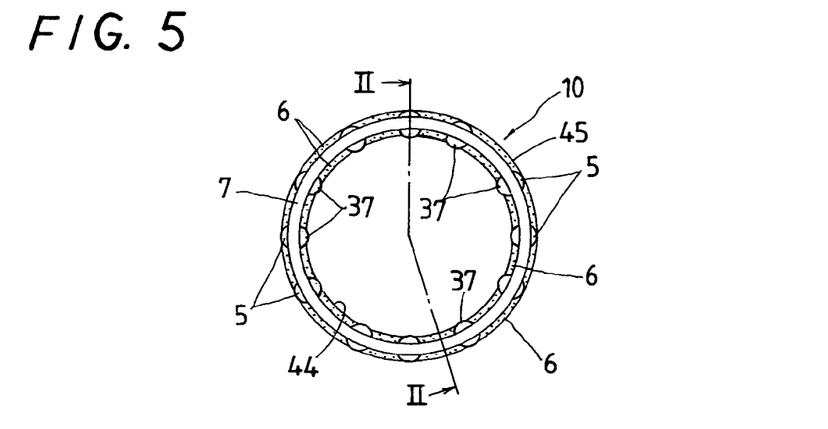
FIG. 5 is a side elevation of the complete unitary molding of FIG. 4.
Figure 7:
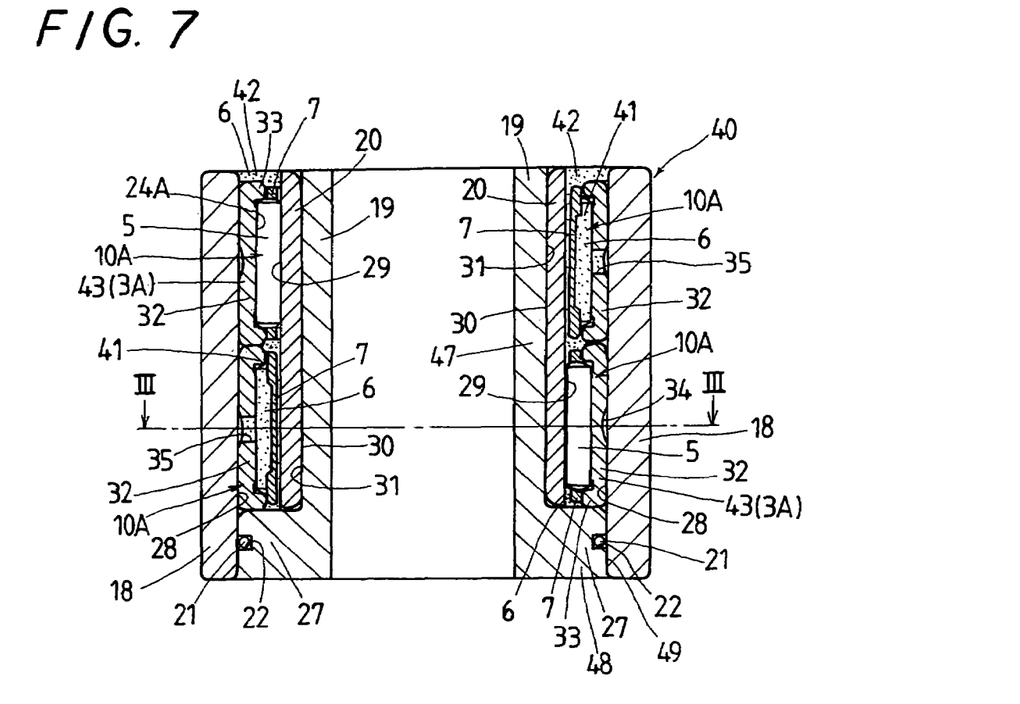
FIG. 7 is an axial sectional view explaining how to fabricate the complete unitary molding with outer ring, which is another preferred embodiment of a rolling-contact bearing containing solid lubricant therein in accordance with the present invention, using a mold especially designed.
Figure 8:
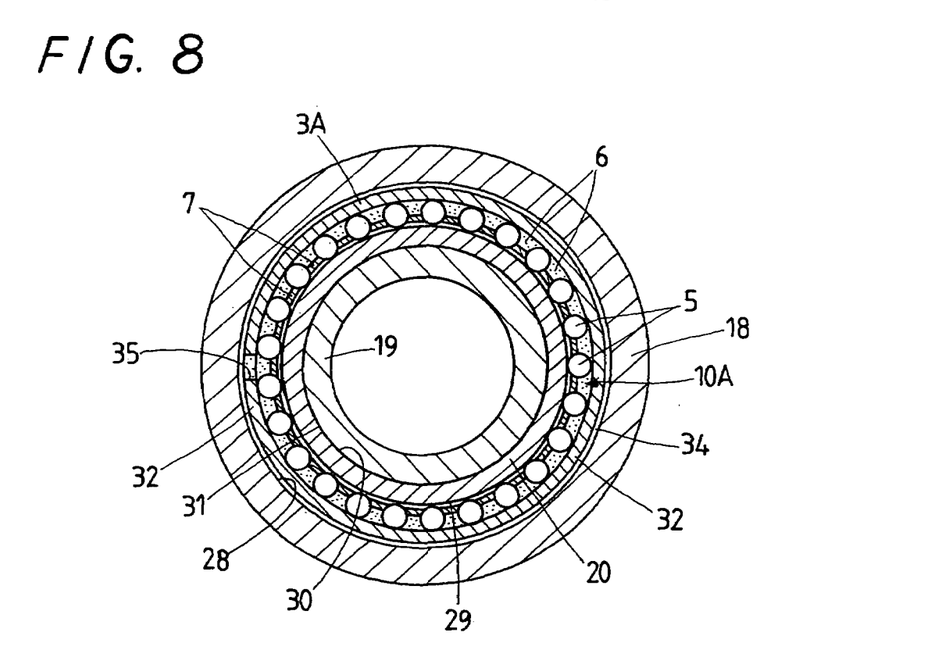
FIG. 8 is a traverse sectional view, taken on the plane along the line III—III of FIG. 7, explaining how to fabricate the complete unitary molding with outer ring of FIG. 7, using a mold especially designed.
Figure 9:
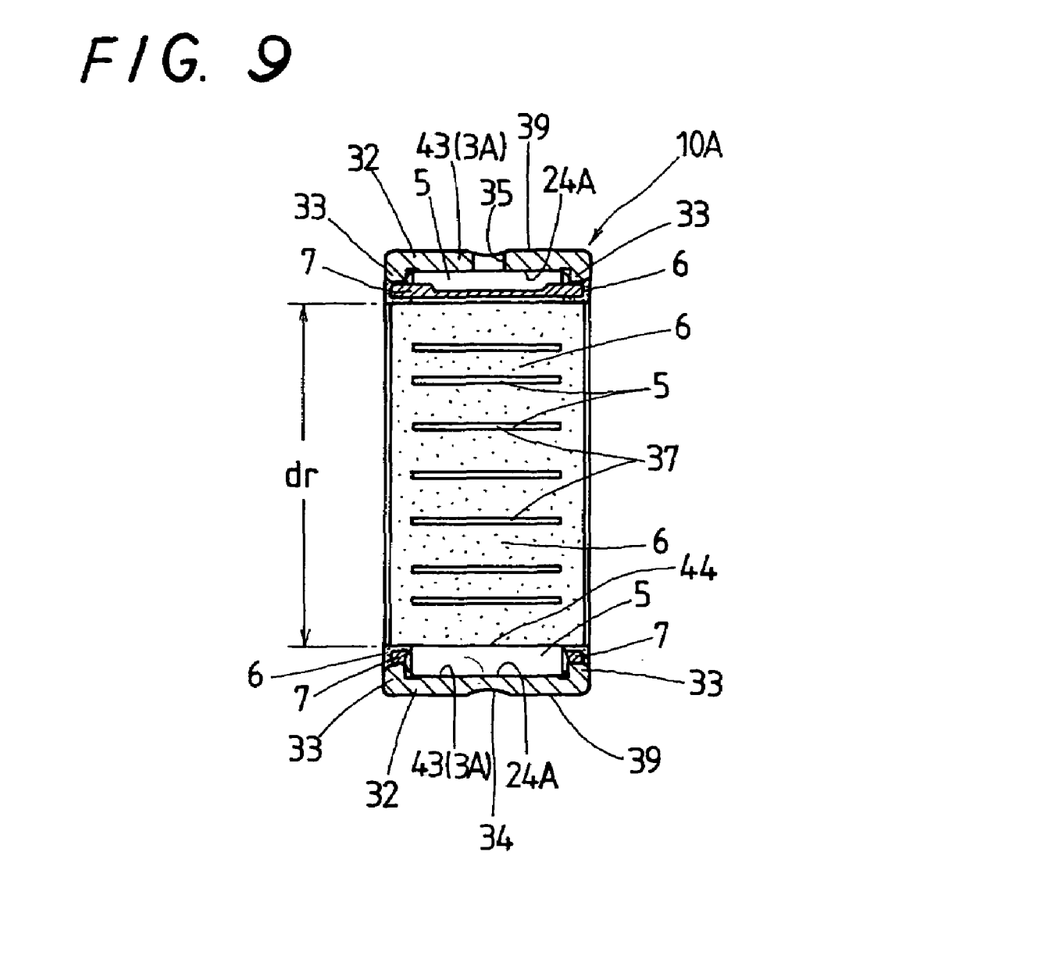
FIG. 9 is an axial sectional view showing a further another embodiment of the rolling-contact bearing containing solid lubricant therein, which is composed of the complete unitary molding with outer ring fabricated with using the mold of FIG. 7.

Preferred embodiments of a rolling-contact bearing containing solid lubricant therein in accordance with the present invention will be explained hereinafter in detail with reference to the accompanying drawings. The rolling-contact bearing containing solid lubricant therein may be applied well to any rolling-contact bearing such as the stud-type roller bearing with tracking roller and so on, which is extensively employed for the cam-follower mechanisms or rolling-contact bearings for linear motion in printing machines, food processing machinery, liquid crystal display/semiconductor device manufacturing equipment, tool machines, industrial robots, office-automation machines, and so on. The rolling-contact bearing containing solid lubricant therein of the present invention features that a solid lubricant 6 to lubricate more than roller is placed between an inside relatively rotating member including an inside ring, stud or the like and an outside relatively rotating member such as an outer ring or the like, and a cage 7 and rollers 5 either alone as shown in FIGS. 4 to 5 or installed in an outer ring 32 as shown in FIGS. 7 to 9 are all assembled together with the solid lubricant into a complete unitary molding 10 or 10A where all components: cage 7, more than one roller 5, outer ring 32 and solid lubricant 6 are integrated, with using a mold 40.

In FIGS. 1 to 5 inclusive, there is shown a rolling-contact bearing containing solid lubricant therein according to the present invention, which is applied to a stud-type roller bearing with tracking roller. The stud-type roller bearing is comprised of an inside relatively rotating member or a stud 1 having a guideway member 3 made thereon with a first rolling element raceway 23, an outside relatively rotating member or an outer ring 2 permitted to rotate relatively to the stud 1 and made with a second raceway 24 in opposition to the first raceway 23, and a cage 7 used to space rollers from each other, which are installed to roll through a race defined between the first and second raceways 23 and 24. The stud-type roller bearing discussed here, especially, features that the rollers 5 and the cage 7 are combined integrally together with the solid lubricant 6, which is to lubricate the rollers 5 rolling through the race, into a complete unitary molding 10 with the help of a mold 40. The complete unitary molding 10 constructed as stated earlier features that the rollers 5 are embedded in the solid lubricant by molding process with the mold 40 in such a way their axial rolling surfaces 37 remain exposed above an inside circular surface 44 of the complete unitary molding 10 to come into rolling-line contact with the second raceway 24 around the guideway member 3, and also features to be incorporated in the race between the stud 1 and the outer ring 2.

Figure 1:
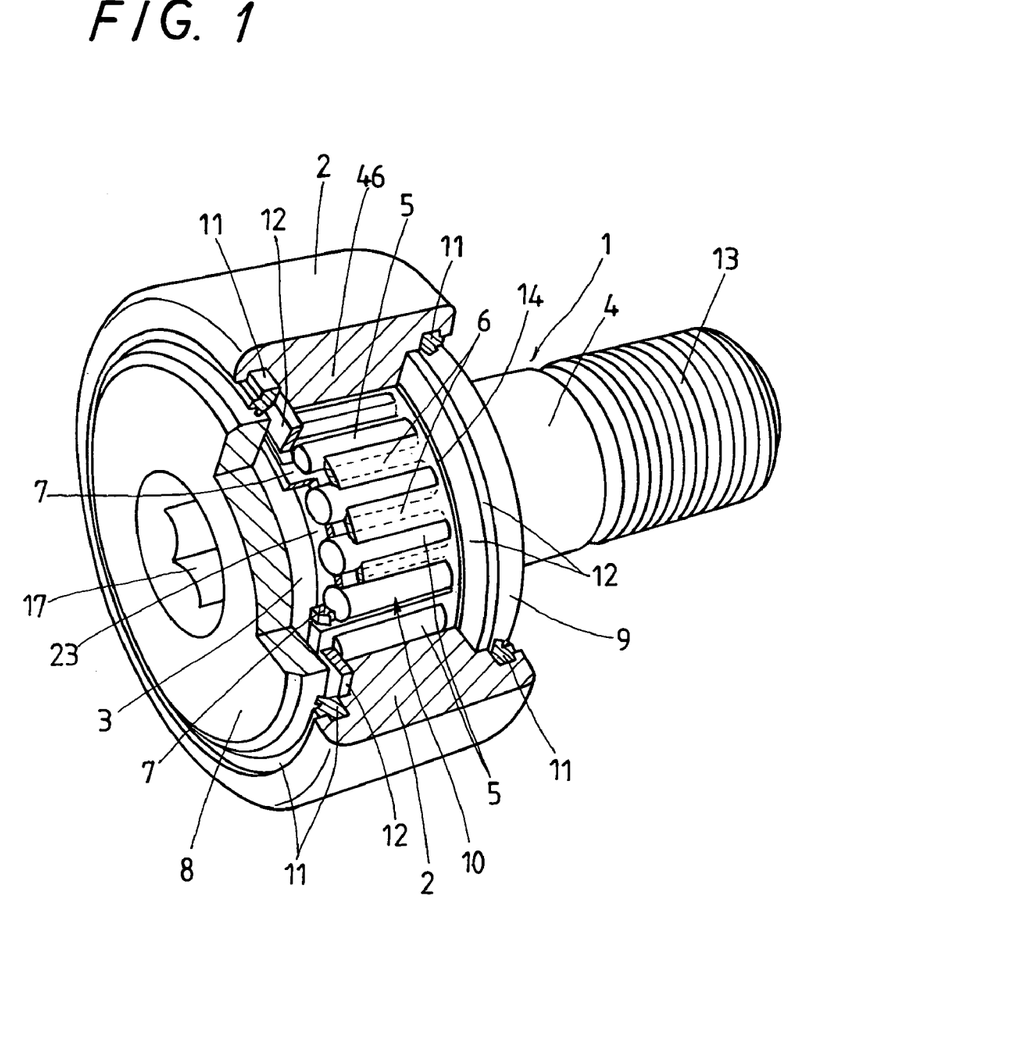
FIG. 1 is a perspective view, partially cut away, showing a preferred embodiment of a stud-type roller bearing with tracking roller, which has incorporated with a rolling-contact bearing containing solid lubricant therein in accordance with the present invention.
Figure 2:
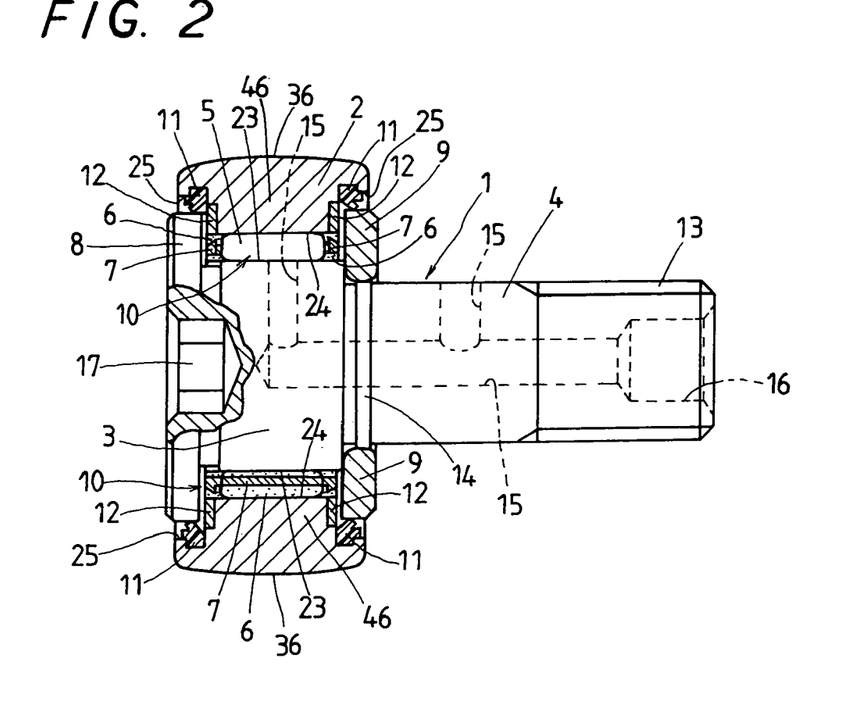
FIG. 2 is an elevation, partially sectioned along the plane of the line I—I of FIG. 3, showing the stud-type roller bearing with tracking roller of FIG. 1.
Figure 3:
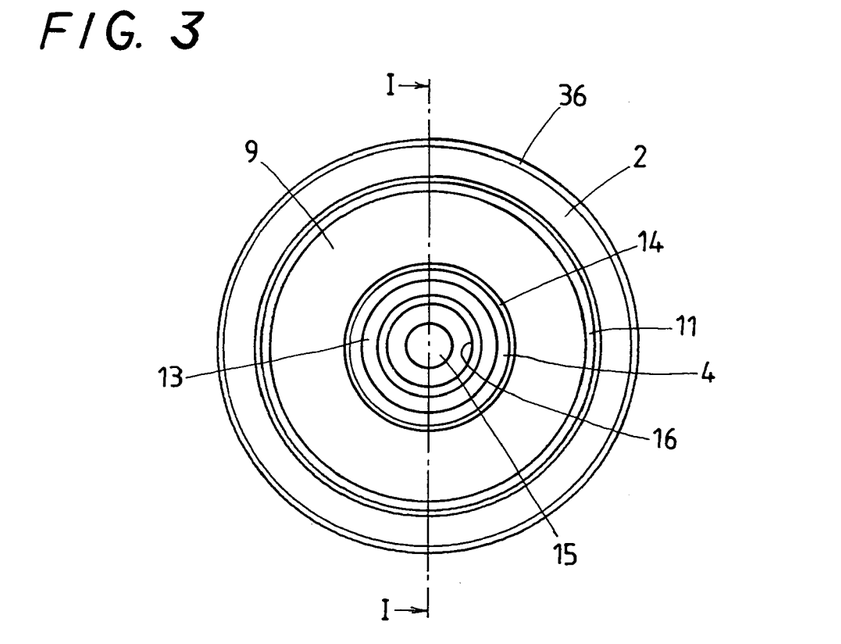
FIG. 3 is a side elevation of the stud-type roller bearing with tracking roller of FIG. 2.

The stud 1 has a flange 8 integral with any one of axially opposite ends of the guideway member 3 and a rod 4 integrally extending from another of the axially opposite ends of the guideway member 3. The rod 4 is made less in diameter than the guideway member 3 and with a plain end having external, or male, threads 13 around there. The rod 4 of the stud 1 is also raised radially at 14 over which a circular plate 9 fits to confine the complete unitary molding 10 against the flange 8. The outer ring 2 is recessed at axially opposite ends thereof to form setbacks 25, one to each end, thereby providing an intermediate area 46 midway between the setbacks 25, on which is made the second raceway 24. The flange 8 on the stud 1 fits in any one of the setbacks 25 while the circular plate 9 fit over the radial raise 14 on the rod 4 of the stud 1 is accommodated in another setback 25. The axial end of the stud 1, on which the flange 8 is mounted, is made with a central hole 17 to receive therein any attachment.

With the stud-type roller bearing with tracking roller constructed according to major design specifications, the complete unitary molding 10 containing solid lubricant therein, after installed between the stud 1 and the outer ring 2, is flanked by thrust rings 12 at axially opposite ends thereof. Then, seal members 11 are assembled in a way coming into abutment against the axially opposing ends of the outer ring 2. The stud 1 is made therein an oil port 16 open at the plain end thereof and extending to an oil passage 15. The outer ring 2 has a circular periphery made in, for example a spherical contour. With the stud-type roller bearing with tracking roller constructed as stated earlier, more particularly, the thrust rings 12 fit in the setbacks 25 recessed in the outer ring 2 on to the flange 8 and the circular plate 9, respectively, are made of wear-resistant plastics such as polyetheretherketone, or PEEK and placed in a way coming into sliding engagement with an outer circumference of the solid lubricant 6 along the axially opposite ends of the complete unitary molding 10. The seal members 11 of synthetic resin or synthetic rubber fit into sealing grooves cut in the setbacks 25 along circular areas, which are axially farther out than the associated thrust rings 12 in the axially opposite setbacks 25 recessed in the outer ring 2. The seal members 11 is each kept in closely sliding contact with a radially outside circumference of either the flange 8 integral with the stud 1 or the circular plate 9 fit over the stud 1. The stud 1 is made therein the oil port 16 open at the plain end thereof and communicating with an oil passage 15, which extends to an radially outside circular surface or the raceway 23 around the guideway member 3, and also communicating with another oil passage 15, which extends to an outside circular surface around the rod 4.

The stud-type roller bearing with tracking roller constructed as recited above features that the complete unitary molding 10 containing solid lubricant therein is incorporated in the race. Moreover, the complete unitary molding 10 features the molding process composed of the steps of setting more than one roller 5, solid lubricant 6 and cage 7 together in the mold 40 at ambient temperature, heating them up to, for example 150° C., thereby fusing together them into a united part with the help of a difference in thermal expansion between an outer mold 18 and an intermediate mold 20. Once cooled down to the ambient temperature, the mold is opened and the complete unitary molding is removed.

Figure 6:
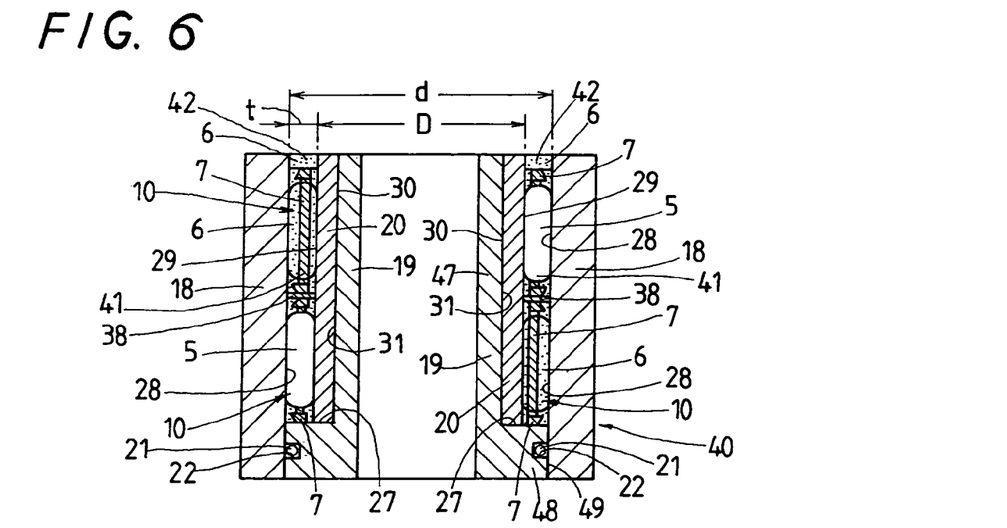
FIG. 6 is an axial sectional view explaining how to fabricate the complete unitary molding of FIG. 4 with the help of a mold especially designed.

With the stud-type bearing with tracking roller of the present invention, the cage 5 and rollers 7 are embedded together in the solid lubricant 6 to be joined together using the solid lubricant into a complete unitary molding 10 as shown in FIGS. 4 and 5, which is then installed in the race, contrary to any conventional bearing construction where the solid lubricant 6 is sealed directly in the race. The complete unitary molding 10 can be fabricated using the jig or mold 40 constructed as illustrated in, for example FIG. 6. The mold 40 is comprised of an outside mold 18, an inside mold 19 and an intermediate mold 20 disposed between the outside and inside molds 18, 19. The cage 7 around which the rollers 5 are positioned circumferentially at a regular interval is placed in a clearance between the outer mold 18 and the intermediate mold 20. In the clearance between the outer mold 18 and the intermediate mold 20, there are placed two sets of the cage with rollers for the unitary moldings 10, which are separated from each other by a spacer 38 as shown in FIG. 6. A paste of ultrahigh molecular weight polyethylene powder mixed with lubricant is poured into the clearance between the outer mold 18 and the intermediate mold 20, where the cage 7 with the rollers 5 positioned circumferentially has been in advance placed. Then, the mold 40 is heated in any furnace, followed by being cooled down to get the polymer material solidified into the complete unitary molding 10. The same sort of molding operation itself can be referred to, for example Japanese Patent Laid-Open No. 2001-208084, paragraph number 0030, which is a co-pending earlier application of the same applicant as this application.

The cage 7, for example illustrated in FIG. 4, is made of a steel sheet formed in a U-shape in transverse cross-section, and provided therein with pockets extending axially of the cage 7 to fit the rollers 5 therein, one to each pocket, which are spaced circumferentially at a regular interval. Each pocket is made in such dimensioned as to permit the associated roller 5 passing through there with no interference, so that the rollers 5 would fall away from the cage 7 if the pockets were left intact. Thus, the solid lubricant 6 poured into the mold 40 makes inroads into the gaps left in pockets between the cage 7 and the rollers 5 to provide the complete unitary molding 10 in which the cage 7 with the rollers 5 is integrally buried in the solid lubricant 6 in a state the rollers 5 being exposed above the solid lubricant 6 to come into direct rolling contact with the raceway 23 on the stud 1.

In the rolling-contact bearing containing the solid lubricant therein of the present invention, unlike any conventional rolling-contact bearing in which the solid lubricant is directly charged into the race where the cage with many rollers fits between the outer ring 2 and the stud 1, the combination of the cage with rollers formed previously into the complete unitary molding 10 using the solid lubricant is brought into the race. This means that the thrust rings 12 and the seal members 11 can be all installed without getting any negative influence from thermal impact that might occur in high temperature in production of the unitary molding 10. The thrust ring 12 is, for example an annular disc cut off from a sheet rectangular in cross section, which is made of thermoplastic synthetic resin including polyetheretherketone, and so on, rich in elastic deformation, wear-proof, mechanical strength and also less in an amount of deformation even under high-temperature environment. The seal member 11 is made of either synthetic resin including polypropylene and so on or synthetic rubber including NBR and so on. With the stud-type bearing with tracking roller in which the complete unitary molding 10 fits into the race, since there is no possibility of any initial solution in the solid lubricant 6 invading the oil passage 15 in the stud 1 as in the prior construction, the oil passage 15 is allowed to serve well to supply a further oil or replenish with lubricating oil. With the conventional stud-type bearing with tracking roller in which the solid lubricant is charged directly, that is to say, any initial solid lubricant solution solidifying into the solid lubricant would invade the oil passage open to the raceway on the stud 1, ending up in solidification with the solid lubricant around the cage-roller combination, thereby hindering the rotating motion. Thus, no conventional stud-type bearing with tracking roller in which the solid lubricant is charged directly could have any oil passage.

With the stud-type bearing with tracking roller in which the thrust rings 12 are incorporated, the outer ring 2 has the circular outside surface 36 made in a part of spherical contour. This means that the stud-type bearing with tracking roller of the present invention could work well even if the bearing were installed with the stud 1 being sort of tilted or any counterpart, not shown, coming into rolling contact with the outer ring 2 were askew, that is, irrespective of any inaccuracies in mounting procedure and any lopsided load.

Referring to FIG. 6, there is illustrated the mold 40 used to produce the complete unitary molding 10, which will be assembled later in the rolling-contact bearing containing solid lubricant therein.

The mold 40 is comprised of a cylindrical outside mold 18 having an inside circular surface 28, a cylindrical inside mold 19 disposed inside the outside mold 18 and made up of a radially thicker area 48 and a radially reduced area 47 less than the thicker area 48, and an intermediate mold 20 disposed in a circular clearance defined between the inside circular surface 28 of the outside mold 18 and an outside circular surface 31 around the reduced area 47 of the inside mold 19 in a way to fit closely over the outside circular surface 31 around the reduced area 47 of the inside mold 19. The inside mold 19 fits into the outside mold 18 in such a relation that the thicker area 48 of the inside mold 19 comes into close engagement with the inside circular surface 28 of the outside mold 18, providing a circular shoulder 27 along a boundary between the thicker area 48 and the reduced area 47 of the inside mold 19. Between the inside circular surface 28 of the outside mold 18 and an outside circular surface 29 of the intermediate mold 20 abutted against the shoulder 27 there is provided a clearance 41 of a preselected distance to allow the unitary molding 10 to lie therein. The thicker area 48 of the inside mold 19 fit into the inside circular surface of the outside mold 18 has a circular groove 22 cut into an outside circular surface 49 around the thicker area 48. An O-ring 21 fits into the circular groove 22 to seal up the clearance 41 between the outside mold 18 and the intermediate mold 20 for, especially keeping the solution and/or paste of the solid lubricant against leakage.

With the mold 40 constructed as stated earlier, especially, the intermediate mold 20 is made of a substance that is larger in thermal expansion compared with other substance for the outside and inside molds 18, 19. When the outside and inside molds 18, 19 are made of steel, the intermediate mold 20 is made of, for example aluminum. A radial dimension t of the clearance 41 left between an interior diameter d describing the inside circular surface 28 of the outside mold 18 and an exterior diameter D drawing the outside circular surface 29 of the intermediate mold 20 is determined to permit the cage 7 with the rollers 5 to fit in there. The intermediate mold 20 is made to have an axial length slightly more than double an axial width of the complete unitary molding 10. Steel has the amount of linear expansion of 11.7 μm/° C. in 1 m of length per a rise in temperature of 1 degree, while the amount of linear expansion of aluminum is 23.03 μm/° C. Now assuming that the outside mold 18 has the interior diameter d and the intermediate mold 20 has the exterior diameter D as shown in FIG. 6, the radial dimension t of the clearance 41 is referred to $t=(d-D)/2$.

How the complete unitary molding 10 is fabricated using the mold 40 will be explained later. The cage 7 with the rollers 5 spaced around the cage 7 is set in the clearance 41 together with the solid lubricant 6 to be made into the complete unitary molding 10 with the help of the difference in thermal expansion between the outside and intermediate molds 18, 20. For making the complete unitary molding 10 with the use of the mold 40, the cage 7 with the rollers 5 spaced at regular intervals is first placed into the clearance 41 between the intermediate mold 20 and the outside mold 18 through a circular ingress 42 open to the clearance 41. The solid lubricant 6 is poured through the ingress 42 into the clearance 41 and around the cage 7 and the rollers 5 to fill the clearance 41 as long as to reach everywhere including gaps left between the cage 7 and every roller 5. The mold 40 is then heated to get the intermediate mold 20 to expand by heat greater than the outside mold 18. Meanwhile, the solid lubricant 6 is pressed against the rollers 5 around the cage 7 with the pressure developed by the difference in thermal expansion between the intermediate mold 20 and the outside mold 18, followed by solidifying at ambient temperature into the complete unitary molding 10.

An alternative molding process to produce the complete unitary molding 10 with using the mold 40 will be explained below. The cage 7 with the rollers 5 spaced at regular intervals is first introduced into the clearance 41 between the intermediate mold 20 and the outside mold 18 through a circular ingress 42 open to the clearance 41. A solution of solid lubricant, for example any paste of ultrahigh molecular polyethylene powder mixed with lubricant, is poured at ambient temperature through the ingress 42 into the clearance 41 and around the cage 7 and the rollers 5 to fill the clearance 41 as long as to reach everywhere including gaps left between the cage 7 and every roller 5. Then mold 40 is heated up to 150° C., where the intermediate mold 21 experiences greater expansion by heat than the outside mold 18. Meanwhile, even though the cage 7 and rollers 5 preserve their original shapes, the solid lubricant 6 is squeezed between the intermediate mold 20 and the outside mold 18 owing to the pressure developed by the difference in thermal expansion between the intermediate mold 20 and the outside mold 18, thereby made more dense, ending up shrinking in thickness. Once cooled down to the ambient temperature, the solid lubricant 6 solidifies into the complete unitary molding 10 while the intermediate mold 20 shrinks to retract, getting off the complete unitary molding 10, which can be removed out of the mold 40. With the complete unitary molding 10 fabricated as stated earlier, the rollers 5 are embedded in the solid lubricant in such a way their rolling surfaces 37 remain exposed above the inside circular surface 44 of the molding 10, so that there will not be no solid lubricant over the rollers 5 at their areas coming into line-rolling contact with the first raceway 23 around the guideway member 3 of the stud 1. Insofar as an outside circular surface 45 of the complete unitary molding 10 is concerned, the solid lubricant 6 remained between the rollers 5 and the outside mold 18 will be squeezed out when the rollers 5 are pushed against the outside mold 18, thereby getting their rolling surfaces exposed partially. Thus, the complete unitary molding 10 constructed as explained earlier does not have to cut away any excess of solid lubricant to expose the rollers 5 at their rolling surfaces coming into line-rolling contact with the associated raceways 23, 24, contrary to the same sort of conventional bearings.

Another embodiment of the rolling-contact bearing containing solid lubricant therein according to the present invention will be explained hereinafter with reference to FIGS. 7 to 9.

The rolling-contact bearing containing solid lubricant therein shown in FIGS. 7 to 9 is a roller bearing having a flanged outer ring 32. By comparison, a complete unitary molding 10A discussed later is fabricated with the same procedures as in the complete unitary molding 10, except that the flanged outer ring 32 has incorporated in the mold 40. The rotating outer ring 32 has flanges 33 at axially opposite ends thereof, and a circular area 43 lying midway between the flanges 33, which provides a circular guideway 3A having a second raceway 24A. The outer ring 32 also has a circular outside surface 39, which is made thereon with an oil groove 34 that extends circumferentially and has a radial oil hole 35 open to the second raceway 24A inside the outer ring 34.

In FIG. 7, there is shown a version of the process for manufacturing the complete unitary molding 10A using the mold 40. This version is substantially the same as the production process of the complete unitary molding 10. The mold 40 used to produce the completely unitary molding 10A is of the same in construction as previously explained in production of the molding 10 and, therefore, the detailed description thereof is omitted here. In this version, the clearance 41 between the outside mold 18 and the intermediate mold 20 is determined to make it possible to place the outer ring 32 embracing the cage 7 with rollers 5 into the clearance 41. The process to produce the complete unitary molding 10A using the mold 40 follows substantially the same principle found in the complete unitary molding 10 stated earlier. The complete unitary molding 10A formed in the modified mold 40, as with the complete unitary molding 10, also does not have to cut away any excess of solid lubricant on the side of an circular inside surface 44 of the complete unitary molding 10A.

The cage 7 with the rollers 5 embraced inside the circular area 43 of the outer ring 32 is first placed into the clearance 41 through the circular ingress 42 open to the clearance 41. The solid lubricant 6 is poured into the clearance 41 and around the cage 7 and the rollers 5 to fill the clearance 41 as long as to reach everywhere including gaps left between the cage 7 and every roller 5, thereby making the complete unitary molding 10A with outer ring, which will fit later over a counterpart or inside relatively rotating member to provide a finished rolling-contact bearing. The complete unitary molding 10A constructed as stated earlier for the provision of the rolling-contact bearing, even though containing the solid lubricant therein, can be formed with high precision in a diameter of the inside circle where the complete unitary molding 10A comes into rolling contact with the inside relatively rotating member. In practice, the diameter of the inside circle where the complete unitary molding 10A comes into rolling contact with the inside relatively rotating member will be made within error limit of a matter of 1 μm for φ 35 mm, when compared between before and after the solid lubricant 6 poured around the cage 7. Thus, the rolling-contact bearing containing solid lubricant therein constructed according to the embodiment discussed now does not have to cut away any excess of the solid lubricant 6, contrary to the same sort of conventional rolling-contact bearings, and is allowed to measure the diameter of circle where the complete unitary molding 10A comes into rolling contact with the relatively rotating inside member. With the rolling-contact bearing containing solid lubricant therein discussed now, no excess of solid lubricant is over rolling-contact areas of the rollers 5 with the raceway 24, making sure of smooth rolling contact of the rollers 5 in the race, thereby providing the rolling-contact bearing with high precision, even though less in manufacturing steps of the complete unitary molding 40. As seen in FIG. 7, the clearance 41 between the outer mold 18 and the intermediate mold 20 is made to allow two outer ring 32 lying side by side in abutment against one another at their opposing flanges 33. Thus, two sets of complete unitary moldings 10A can be manufactured in a single molding operation.

Insofar as the difference in expansion by heat between the outer mold 18 and the intermediate mold 20 is concerned, now assuming that the complete unitary molding 10A is made with an inside bore having a diameter of φ 35 mm and fit clearance between the relatively rotating inside member and the inside bore of the complete unitary molding 10A is determined, on average, a matter of 25 μm at ambient temperature, the increment in diameter for a rise in temperature of from ambient temperature to 150° C. is 53 μm for steel while 105 μm for aluminum. Occurrence of about 27 μm, on average, in difference of expansion by heat at 150° C. would be thus expected to cause the clearance 41 to shrink or reduce in radial direction, rendering the clearance 41 less than the radial thickness of the complete unitary molding 10A. Even under the low temperature where the complete unitary molding 10A solidifies as the mold 40 cools, especially, the radial distance between the outside circular surface 29 of the intermediate mold 20 and the inside circular surface of the solid lubricant 6 in the complete unitary molding 10A remains less clearance than the radial thickness of the complete unitary molding 10A. As a result, the solid lubricant 6 is cleared away from the rollers 5 to expose the rollers 5 above the solid lubricant 6, thereby making sure of direct rolling contact of the rollers 5 to the raceway on the relatively rotating inside member, which fits into the complete unitary molding 10A.

The rolling-contact bearing with flanged outer ring, or the rolling-contact bearing with the outer ring 32 flanged at the axially opposing ends 33, shown in FIG. 9 is advantageously produced by the process in which the complete unitary molding 10A is fabricated using the mold 40 illustrated in FIG. 7. Upon molding operation of the solid lubricant 6 in the rolling-contact bearing with the flanged outer ring 32, it is absolute prerequisite to keep the solid lubricant 6 away from entering into between the rollers 5 and the outer ring 32. With the prior production procedure in which the solid lubricant is poured simply into the clearance, the solid lubricant 6 would make inroad into between the rollers 5 and the raceway 24 of the outer ring 32. To cope with this, the mold conventionally has to apply forcibly any pressure on the side of the inside circle to get the solid lubricant 6 receding. In rolling-contact bearing, even if the solid lubricant 6 remains making inroad into between the rollers 5 and the raceway 24A of the outer ring 32, the complete unitary molding 10A would be unable or tough to fit over the counterpart such as inner ring, rotating shaft, journal and the like to assemble the rolling-contact bearing into any machinery or equipment. Moreover, the outer ring 32, as shown in FIG. 9, has the oil hole 35 and the oil grooves 34 to allow the replenishment of oil. With the alternative embodiment, the oil hole 35 and the oil groove 34 are all made open to the outside circular surface 39 of the outer ring 32, contrary to the first embodiment of the stud-type roller bearing with tracking roller. This means that the solid lubricant, even if having solidified in the oil hole 35 and the oil groove 34, can be well removed in any following step.

What is claimed is:

1. A rolling-contact bearing containing a solid lubricant therein comprising;

an inside rotating member having a guideway area made thereon with a first raceway, an outside rotating member rotary relative to the inside rotating member and having a second raceway opposed to the first raceway; and a preassembled cage including cylindrical rollers spaced at a preselected interval around the cage to roll through a circular cylindrical race defined between the first raceway on the inside rotating member and the second raceway on the outside rotating member;

wherein the preassembled cage is embedded in a solid lubricant together with the cylindrical rollers to form a preassembled unitary molding in which the rollers are lubricated when the preassembled unitary molding is engaged to run through the race;

wherein rolling-surfaces of the rollers of the unitary molding are partially exposed out of an inside circular surface of the unitary molding;

wherein the inside rotating member is a stud having a flange integral with one of axially opposite ends of the guideway area and a rod integrally extending from another of the axially opposite ends of the guideway area and having a diameter smaller than that of the guideway area and a circular plate fitting over the rod of the stud, wherein the outside rotating member is an outer ring recessed at axially opposite ends thereof to form setbacks, thereby providing an intermediate area midway between the setbacks forming the second raceway, wherein the flange on the stud fits in any one of the setbacks while the circular plate fits in another of the setbacks, and wherein the stud has an oil port open at a free end thereof and communicating with an oil passage, which extends to a radially outside circular surface around the guideway area, and also communicating with another oil passage, which extends to an outside circular surface around the rod, whereby the oil passage extending to the guideway area of the stud is protected against being blocked with the solid lubricant of the unitary molding.

2. The rolling-contact bearing containing the solid lubricant therein, constructed as defined in claim 1, wherein thrust rings made of wear-resistant plastics of polyetheretherketone and respectively fit in the setbacks recessed in the outer ring on and against to the flange and the circular plate, and wherein the thrust rings are placed along an outer circumference of axially opposite ends of the unitary molding.

3. The rolling-contact bearing containing the solid lubricant therein, constructed as defined in claim 1, wherein seal members of synthetic resin or synthetic rubber are respectively placed in abutment against outer circumferences of the flange and the circular plate.

4. The rolling-contact bearing containing the solid lubricant therein, constructed as defined in claim 1, wherein the outer ring has an outside surface of spherical configuration.

5. A rolling-contact bearing containing a solid lubricant therein comprising;

an inside rotating member having a guideway area made thereon with a first raceway, an outside rotating member rotary relative to the inside rotating member and having a second raceway opposed to the first raceway; and a preassembled cage with cylindrical rollers spaced at a preselected interval around the cage to roll through a circular cylindrical race defined between the first raceway on the inside rotating member and the second raceway on the outside rotating member;

wherein the preassembled cage with the cylindrical rollers are engaged together as a preassembled unitary molding in a mold by a solid lubricant which lubricates the rollers running through the race;

wherein rolling-surfaces of the rollers of the preassembled unitary molding are partially exposed out of an inside circular surface of the unitary molding;

wherein the outside rotating member is an outer ring having flanges at axially opposite ends thereof and a circular area lying midway between the flanges, the cage with the rollers being embraced inside the circular area of the outer ring the cage;

wherein the outer ring, the preassembled cage with the cylindrical rollers are all formed together with solid lubricant by use of the mold into a complete unitary molding;

wherein the preassembled unitary molding including the outer ring therein fits over the inside rotating member; and wherein the outer ring has an oil groove made circumferentially of a circular outside surface thereof, and an oil hole extended from the circular outside surface to a circular inside surface of the outer ring.

6. A rolling-contact bearing containing a solid lubricant therein, comprising:

an inside rotating member having a guideway area made thereon with a first raceway, an outside rotating member rotary relative to the inside rotating member and having a second raceway opposed to the first raceway, and a preassembled cage including cylindrical rollers spaced at a preselected interval around the cage to roll through a circular cylindrical race defined between the first raceway on the inside rotating member and the second raceway on the outside rotating member;

wherein the preassembled cage is embedded in a solid lubricant together with the cylindrical rollers to form a preassembled unitary molding in which the rollers are lubricated when running through the race;

wherein rolling-surfaces of the rollers of the unitary molding are partially exposed out of an inside circular surface of the unitary molding;

wherein the inside rotating member is a stud having a flange integral with one of axially opposite ends of the guideway area and a rod integrally extending from another of the axially opposite ends of the guideway area and having a diameter smaller than that of the guideway area and a circular plate fitting over the rod of the stud, wherein the outside rotating member is an outer ring recessed at axially opposite ends thereof to form setbacks, thereby providing an intermediate area midway between the setbacks forming the second raceway, wherein the flange on the stud fits in any one of the setbacks while the circular plate fits in another setback, and wherein a mold for forming the unitary molding is comprised of an outside mold having an inside circular surface, an inside mold disposed inside the outside mold and made up of a radially thicker area and a radially reduced area less than the thicker area, and an intermediate mold disposed to fit closely over an outside circular surface around the reduced area of the inside mold, defining a circular clearance over the inside circular surface of the outside mold, the intermediate mold being made of a substance that is larger in thermal expansion than other substance for the outside and inside molds.

7. The rolling-contact bearing containing the solid lubricant therein, constructed as defined in claim 6, wherein the unitary molding is comprised of the preassembled cage with the cylindrical rollers spaced at regular intervals is first placed into the clearance between the intermediate mold and the outside mold and the solid lubricant is poured into the clearance and around the cage and the rollers to fill the clearance as long as to reach everywhere including gaps left between the cage and every roller, then the mold is heated to get the intermediate mold to expand by heat greater than the outside mold, whereby the solid lubricant is pressed against the rollers around the cage with pressure developed by the difference in thermal expansion between the intermediate mold and the outside mold, followed by solidifying at ambient temperature into the complete unitary molding.

8. The rolling-contact bearing containing the solid lubricant therein, constructed as defined in claim 7, wherein the solid lubricant in solution state is poured into the clearance and around the cage and the rollers to fill the clearance as long as to reach everywhere including gaps left between the cage and every roller, followed by solidifying at ambient temperature.

9. A rolling-contact bearing containing solid lubricant therein comprising;

an inside rotating member having a guideway area made thereon with a first raceway, an outside rotating member rotary relative to the inside rotating member and having a second raceway opposed to the first raceway; and a cage with rollers spaced at a preselected interval around the cage to roll through a race defined between the first raceway on the inside rotating member and the second raceway on the outside rotating member;

wherein the outside rotating member is an outer ring having flanges at axially opposite ends thereof and a circular area lying midway between the flanges, the cage with the rollers being engaged against the circular area of the outer ring;

wherein the outer ring and the cage with the rollers are all formed together as a unitary molding in a mold by a solid lubricant;

wherein the unitary molding including the outer ring therein is slid over the inside rotating member to form the assembled bearing; and wherein the outer ring has an oil groove made circumferentially of a circular outside surface thereof, and an oil hole extended from the circular outside surface to a circular inside surface of the outer ring.

10. The rolling-contact bearing containing the solid lubricant therein, constructed as defined in claim 9, wherein the mold is comprised of an outside mold having an inside circular surface, an inside mold disposed inside the outside mold and made up of a radially thicker area and a radially reduced area less than the thicker area, and an intermediate mold disposed to fit closely over an outside circular surface around the reduced area of the inside mold, defining a circular clearance over the inside circular surface of the outside mold, the intermediate mold being made of a substance that is larger in thermal expansion than other substance for the outside and inside molds.

11. The rolling-contact bearing containing the solid lubricant therein, constructed as defined in claim 10, wherein the outside rotating member of the outer ring having flanges at axially opposing ends thereof is placed in the clearance between the intermediate mold and the outside mold, and the cage with the rollers spaced at regular intervals is surrounded with the inside circular surface of the inside of the outer ring.

12. The rolling-contact bearing containing the solid lubricant therein, constructed as defined in claim 11, wherein the solid lubricant is poured in the clearance and around the outer ring, cage and the rollers to fill the clearance as long as to reach everywhere including gaps left between the cage and every roller, then the mold is heated to get the intermediate mold to expand by heat greater than the outside mold, whereby the solid lubricant is pressed against the rollers around the cage with pressure developed by the difference in thermal expansion between the intermediate mold and the outside mold, followed by solidifying at ambient temperature into the unitary molding.

* * * * *